United States Patent [19]

Nix et al.

[11] Patent Number: 5,420,815
[45] Date of Patent: May 30, 1995

[54] DIGITAL MULTIPLICATION AND ACCUMULATION SYSTEM

[75] Inventors: Michael A. Nix, Buda; John Bartkowiak, Austin, both of Tex.

[73] Assignee: Advanced Micro Devices, Inc., Sunnyvale, Calif.

[21] Appl. No.: 783,837

[22] Filed: Oct. 29, 1991

[51] Int. Cl.$^6$ ................................................ G06F 7/52
[52] U.S. Cl. ................................. 364/750.5; 364/748; 364/757
[58] Field of Search .............. 364/736, 754, 750.5, 364/748, 757

[56] References Cited

U.S. PATENT DOCUMENTS

| | | |
|---|---|---|
| 4,507,728 | 3/1985 | Sakamoto et al. ............... 364/736 |
| 4,942,547 | 7/1990 | Joyce et al. ..................... 364/736 |
| 4,996,661 | 2/1991 | Cox et al. ....................... 364/736 |
| 5,119,324 | 6/1992 | Ahsan ............................. 364/736 |
| 5,128,890 | 7/1992 | Girardeau, Jr. ................. 364/754 |

FOREIGN PATENT DOCUMENTS 2218548 11/1989 United Kingdom .......... G06F 7/49

Primary Examiner—Roy N. Envall, Jr.
Attorney, Agent, or Firm—Foley & Lardner

[57] ABSTRACT

A multiplication system performs a series of multiplications and accumulations of plural pairs of first and second operands. The system includes first and second buses, a memory for storing the plural pairs of first and second operands, and a read buffer coupled to the memory for sequentially reading the first and second operands. An accumulator coupled to the first bus receives the first operands from the read buffer and stores the first operands. A multiplier, coupled to the first and second buses, receives the first and second operands in parallel over the first and second buses respectively from the accumulator and the read buffer respectively to provide a series of products. The system further includes an accumulator for accumulating the products to provide a final accumulated product.

21 Claims, 1 Drawing Sheet

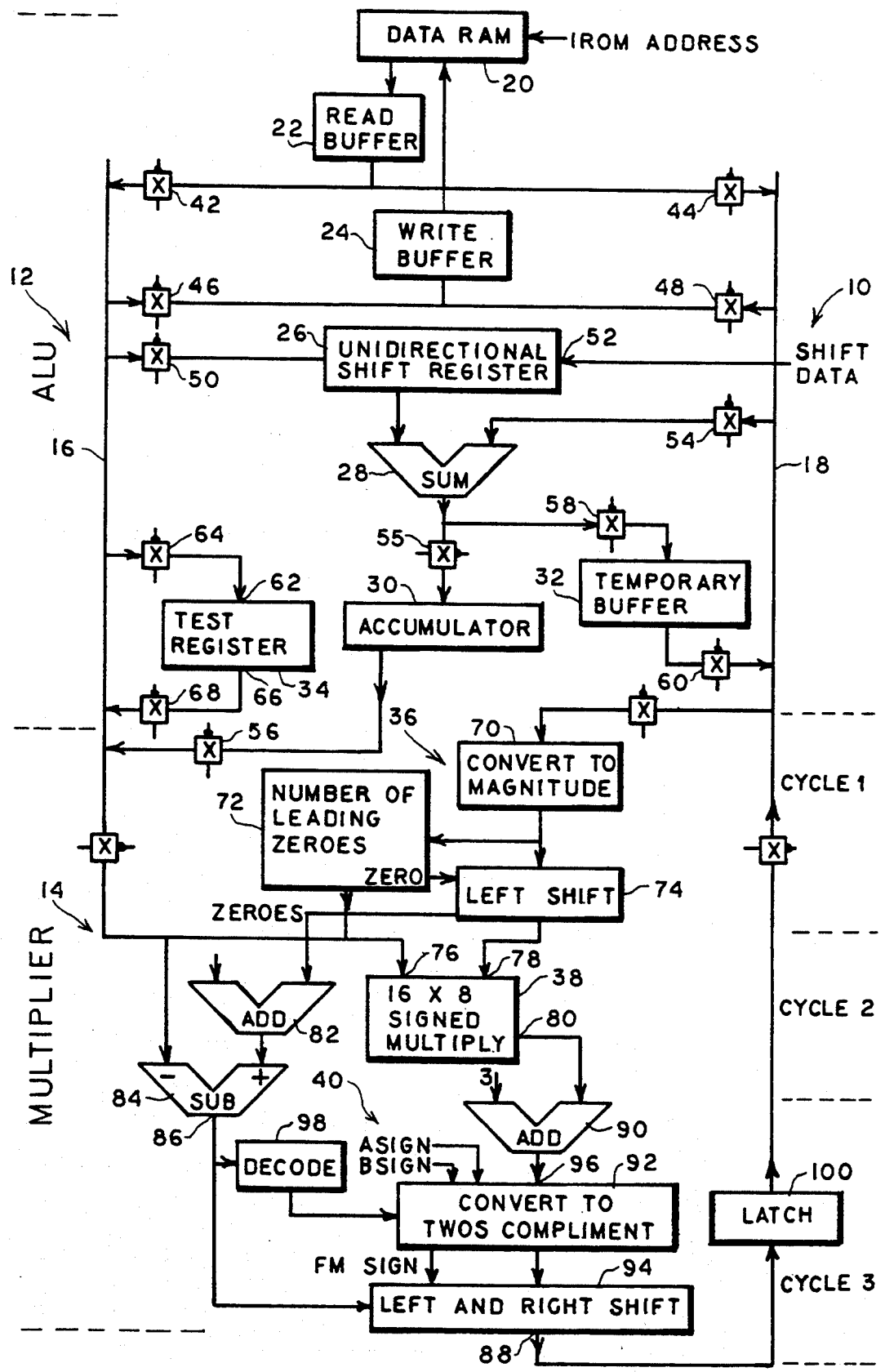

5,420,815

DIGITAL MULTIPLICATION AND ACCUMULATION SYSTEM

BACKGROUND OF THE INVENTION

The present invention generally relates to an improved digital multiplication system. The present invention more particularly relates to such a system for efficiently performing a series of multiplications of plural pairs of first and second operands to derive a series of multiplication products. The present invention is still further directed to such a system capable of accumulating the multiplication products and which performs the multiplications and accumulations in fewer operating cycles than heretofore possible.

Digital multiplication and accumulation are often required of digital signal processors for many applications. One such application is in the implementation of Recommendation G.721 for use in cordless portable telephony. One function required in Recommendation G.721 is the performance of eight serial multiplications of eight different pairs of first and second multiple-bit binary operands and the accumulation of the multiplication products. In addition, Recommendation G.721 requires, to perform this function, one set of operands to be in floating point format, the second set of operands to be in fixed point format, and the accumulated product to be in fixed point format.

Digital signal processors generally are in integrated circuit form for such an application and are powered by portable power sources such as a battery. It is therefore advantageous for such digital signal processors to perform their required functions in a minimum number of operating cycles to conserve battery power. Unfortunately, prior art digital signal processors generally require a great number of operating cycles to perform this serial multiplication and accumulation required by Recommendation G.721. For example, one digital signal processor required 396 operating cycles, another digital signal processor required 354 cycles, and still another digital signal processor requires 122 operating cycles to perform this G.721 function. Obviously, any reduction in the number of operating cycles to perform this G.721 function would represent an advantage in conserving battery power.

The multiplication system of the present invention may be utilized to advantage in a digital signal processor for performing the aforementioned multiplication and accumulation function required by Recommendation G.721. It requires just 31 operating cycles to complete the required function representing a considerable savings in execution time and battery power. In addition, the multiplication system of the present invention is structured in a pipelined arrangement to not only reduce the required operating cycles, but in addition, the sections of the multiplication and accumulation system not currently active may be powered down to further conserve power. Further, all of the operands may be stored in a single memory.

SUMMARY OF THE INVENTION

The invention provides a digital multiplication system for efficiently performing a multiplication of first and second operands in a reduced number of successive operating cycles. The system includes memory means for storing the first and second operands, first and second buses, and read buffer means coupled to the memory means for reading the first operand from the memory means during a first operating cycle and reading the second operand from the memory means during a second operating cycle. The read buffer means is also coupled to the first and second buses. The system further includes storing means coupled to the first bus for receiving the first operand from the read buffer means during the second operating cycle as the read buffer means reads the second operand from the memory means and multiplier means for multiplying the first and second operands. The multiplier means is coupled to the first and second buses for receiving the first operand from the storing means over the first bus and the second operand from the read buffer means over the second bus during a third operating cycle.

The present invention further provides a multiplication system for performing a series of multiplications of plural pairs of first and second operands. The system includes a memory for storing the plural pairs of first and second operands, read means coupled to the memory for sequentially reading the first and second operands, first and second buses, and storing means coupled to the first bus for receiving the second operands from the read means and storing the second operands. The system further includes multiplier means for multiplying the pairs of first and second operands for providing a series of products, the multiplier means being coupled to the first and second buses for receiving the first and second operands in parallel over the first and second buses respectively from the storing means and the read means respectively.

The system may further include summing means including a summer coupled to the first and second buses for adding the products together to provide a series of accumulated products.

BRIEF DESCRIPTION OF THE DRAWINGS

The features of the present invention which are believed to be novel are set forth with particularity in the appended claims. The invention, together with further objects and advantages thereof, may best be understood by making reference to the following description taken in conjunction with the accompanying drawing, in the sole FIGURE of which like reference characters identify identical elements and wherein the sole FIGURE is a schematic circuit diagram of a multiplication and accumulation system embodying the present invention which may be utilized to advantage in a digital signal processor.

DETAILED DESCRIPTION OF THE PREFERRED EMBODIMENT

Referring now to the sole FIGURE, it illustrates a multiplication and accumulation system 10 embodying the present invention. The system 10 generally includes an arithmetic logic unit 12, a multiplying means 14, a memory 20, and first and second buses 16 and 18 in common with arithmetic logic unit 12 and multiplying means 14.

The arithmetic logic unit 12 includes a read buffer 22, a write buffer 24, a unidirectional shift register 26, a summer 28, an accumulator 30, a temporary buffer 32, and a test register 34. The multiplying means 14 includes a first converting means section 36, a multiplier section 38, and a second converting means section 40.

The memory 20 preferably comprises a random access memory which is arranged to store the operands to be utilized in the serial multiplication and accumulation process performed by the system 10. To that end, the memory 12 stores the first set of operands comprising the first operands and the second set of operands comprising the second operands. The first operands are multiple-bit binary floating point numbers and the second operands are multiple-bit binary fixed point numbers.

The read buffer 22 is coupled to the memory 20 and to the first and second buses 16 and 18 through transfer gates 42 and 44 respectively. The transfer gates 42 and 44 preferably take the form of CMOS transfer gates of the type well known in the art which, when activated, provide a low impedance path, and which, when turned off, provide a high impedance or isolation. The transfer gates 42 and 44 thus provide access to the first and second buses 16 and 18 respectively to the read buffer 22. Other such transfer gates will be referred to hereinafter as simply transfer gates.

The write buffer 74 is coupled to the memory 20 and to the first and second buses 16 and 18 respectively by transfer gates 46 and 48 respectively. As will be seen hereinafter in accordance with this preferred embodiment, the write buffer 24 serves to write the first set of operands back to the memory 20 at locations which are incremented by one incident.

The unidirectional shift register 26 is coupled to the first bus 16 through a transfer gate 50 and to a source of shift data (not shown) which is received at an input 52. In accordance with this preferred embodiment, the unidirectional shift register 26 is not called upon to shift data which it receives but is illustrated for purposes of completeness.

The summer 28 is coupled to the unidirectional shift register 26 and to the second bus 18 through a transfer gate 54. As will be seen hereinafter, the summer 28 receives the first operands from bus 16 and transfers the first operands to the accumulator 30. The summer 28 also adds the products provided by the multiplying means 14 in a manner to be described hereinafter and provides the sum of the products to the accumulator 30.

The accumulator 30 is coupled to the summer 28 by transfer gate 55 and to the first bus 16 through a transfer gate 56. As will be seen hereinafter, the accumulator 30 serves as a storing means for storing the first operands and the product sums provided by the summer 28.

The temporary buffer 32 is coupled between the output of the summer 28 by a transfer gate 58 and to the second bus 18 through a transfer gate 60. The temporary buffer 32 in accordance with this preferred embodiment is utilized for storing the first operand of the second set of operands which is placed into the temporary buffer 32 by a previous digital signal processor operation.

The test register 34 has an input 62 coupled to the first bus 16 by a transfer gate 64 and an output 66 which is coupled to the first bus 16 by another transfer gate 68. As will be seen hereinafter, in accordance with this preferred embodiment, the test register 34 forms a register means for storing the product sums as the system 10 performs the serial multiplications and accumulates.

As previously mentioned the multiplying means 14 comprises three sections, the first section being a first converting means 36, the second section being a multiplier 38, and the third section being a second converting means 40. As illustrated in the figure, the first converting means 36 is operable during the first cycle of a multiplication, the multiplier 38 is operable during the second cycle of a multiplication, and the second converting means 40 is operable during the third cycle of a multiplication. Each of these cycles corresponds to an operating cycle of the system 10.

The first converting means 36 converts the second fixed point operands to second floating point operands. This is required because the multiplier 38 is configured for multiplying a pair of floating point operands. In accordance with techniques well known in the art, the first converting means 36 includes a convert to magnitude section 70, a number of leading zeros section 72, and a left shifter 74. These elements, in a manner well known in the art, convert the second operands from a fixed point format to a floating point format for the multiplier 38.

The multiplier 38 comprises a 16-bit by 8-bit floating point signed magnitude multiplier of the type well known in art. It includes a first input 76 for receiving the first operands and second input 78 for receiving the second operands which have been converted to floating point format by the first converting means 36. The multiplier 38 multiplies the multiple-bit mantissas of the operands and provides a floating point product at its output 80. The multiplier further includes an adder 82 and a subtractor 84 for combining the multiple-bit exponents of the first and second operands to provide a combined exponent at an output 86.

The second converting means 40 converts the floating point products provided by the multiplier 38 at its output 80 to fixed point products at an output 88. The second converting means 40 includes an adder 90, a convert to two's compliment 92, and a left and right shifter 94. The adder 90 rounds the multiple-bit floating point products by three bits and provides the rounded floating point products to the convert to two's compliment at an input 96. The convert to two's compliment 92 and left and right shifter 94 under the control of a shift decoder 98 convert the floating point products to fixed point products in a manner which is fully described in copending U.S. patent application Ser. No. 07/766,814, filed Sep. 26, 1991, for Improved System for Converting a Floating Point Signed Magnitude Binary Number to a Two's Compliment Binary Number, in the name of Michael Nix, which application is assigned to the assignee of the present invention and incorporated herein by reference.

The resulting fixed point products are latched in a latch 100. When the fixed point products are latched in latch 100, they are available to the second bus 18 for accumulation in a manner to be described hereinafter.

As will be appreciated by those skilled in the art, the operation of the system 10 is performed during discrete and successive operating cycles pursuant to operating instructions obtained from an instruction memory, such as an instruction read only memory (not shown). The operation of the system 10 will be described hereinafter with respect to each operating cycle for multiplying and accumulating four pairs of first and second multiple-bit binary operands. The first operands ($DQ_i$) wherein i is equal to 0 to 3, are originally in floating point format and the second operands ($B_n$), wherein n is equal to 1 through 4, are originally in fixed point format.

In the first operating cycle, the first operand of the first of operands, $DQ_0$ is read from the memory 20 and stored in the read buffer 22. In the second operating cycle, operand $DQ_0$ is transferred from the read buffer 22 to the accumulator 30 and to the write buffer 24. This is accomplished by the read buffer 22 driving the first bus 16 to transfer $DQ_0$ to the summer 28 through the unidirectional shift register 26. The second bus 18 is driven with all zeros so that the output of the summer 28 is the value of $DQ_0$ which is stored in the accumulator 30. The operand $DQ_0$ is transferred to the write buffer 24 also over the first bus 16 to prepare the write buffer 24 for transferring operand $DQ_0$ back to the memory 20 into data location $DQ_1$ for updating the memory 20. Also during the second operating cycle, the first operand of the second set of operands ($B_1$) is transferred from the memory 20 into the read buffer 22.

With the first operand of the first set of operands ($DQ_0$) being in the accumulator 30 and the first operand of the second set of operands ($B_1$) being in the read buffer 22, the first multiply can begin in the multiplier 14 with the accumulator 30 driving the first bus 16 with the value of $DQ_0$ and the read buffer driving the second bus 18 with the value of $B_1$. The first multiply begins during the third operating cycle with the first converting means 36 converting $B_1$ from the fixed point format to the floating point format.

In the fourth operating cycle the second operand $DQ_1$ of the first set of operands is read from the memory 20 into the read buffer 22. Also during the fourth cycle, the second cycle of the first multiply is performed by the multiplier 38 multiplying the first pair of operands $DQ_0$ and $B_1$.

During the fifth operating cycle, $DQ_0$ is transferred from the write buffer 24 to the memory 20 and is stored therein at memory location $DQ_1$. Also during the fifth cycle, the third cycle of the first multiply is performed by the second converting means 40 which converts the floating point product of $DQ_0$ and $B_1$ to fixed point format and stores the first product in the latch 100.

During the sixth operating cycle, the next or second operand $DQ_1$ of the first set of operands is transferred from the read buffer 22 to the accumulator 30 over bus 16 and through the unidirectional shift register 26 and the summer 28 in the same manner as previously described with respect to the transference of $DQ_0$ from the read buffer 22 to the accumulator 30. Also, $DQ_1$ is transferred from the read buffer to the write buffer. In addition, during the sixth operating cycle, the next or second operand $B_2$ of the second set of operands is read from the memory 20 and stored in the read buffer 22.

During the seventh operating cycle, the second multiply begins. The accumulator 30 drives the first bus 16 with the value of $DQ_1$ and the read buffer 22 drives the second bus 18 with the value of $B_2$. During the seventh operating cycle, $B_2$ is converted to floating point format by the first converting means 36 of the multiplying means 14.

During the eighth operating cycle, the first multiply product is accumulated with the contents of the test register 34. This is accomplished by the latch 100 driving the second bus 18 with the value of the first multiply product which is received by the summer 28. The contents of the test register 34, which at this time is assumed to be all zeros, is driven onto bus 16 through the unidirectional shift register 26 to the summer 28 where it is added to the first multiply product. The first product sum is then stored in the accumulator 30. Also during the eighth operating cycle, the third operand $DQ_2$ of the first set of operands is read from memory 20 and transferred to the read buffer 22. The second multiply proceeds through its second cycle in the multiplying means 14 with $B_2$ and $DQ_1$ being multiplied in the multiplier 38.

In the ninth operating cycle, the first accumulated product is transferred from the accumulator 30 to the test register 34 over the first bus 16. Also during this ninth operating cycle, $DQ_1$ is transferred from the write buffer 24 to the memory 20 and stored therein at storage location $DQ_2$. Lastly, during this ninth operating cycle, the second multiply completes the third multiply cycle by the second product resulting from the multiplication of $B_2$ and $DQ_1$ being converted from the floating point format to the fixed point format in the second converting means 40 and is stored in the latch 100.

During the tenth operating cycle, $DQ_2$ is transferred from the read buffer 22 to the accumulator 30 in the manner as previously described and to the write buffer 24. Also, the third operand $B_3$ of the second set of operands is read from the memory 20 and transferred to the read buffer 22.

In the eleventh operating cycle, the third multiply begins with the accumulator 30 driving bus 16 with the value of $DQ_2$ and the read buffer 22 driving bus 18 with the value of $B_3$. During this eleventh operating cycle, $B_3$ is converted from the fixed point format to the floating point format by the first converting means 16.

During the twelfth operating cycle, the second multiply products stored in latch 100 is accumulated with the first product sum which is stored in the test register 34. This is accomplished by the latch 100 driving bus 18 with the value of the second product ($DQ_1 \times B_2$) and the test register 34 driving bus 16 with its contents which at this time is the first product ($DQ_0 \times B_1$). The summer 28 adds the contents of the test register 34 and the second product received from latch 100 to provide a second accumulated product and stores the second accumulated product in the accumulator 30. Also during the twelfth operating cycle, the next and last operand $DQ_3$ of the first set of operands is read from memory 20 and stored in the read buffer 22. Lastly, this twelfth operating cycle, the third multiply is in its second cycle with the multiplication of $B_3$ and $DQ_2$ in the multiplier 38.

In the thirteenth operating cycle, the second accumulated product within the accumulator 30 is transferred to the test register 34 over the first bus 16. Also, $DQ_2$ is transferred from the write buffer 24 to the memory 20 wherein it is stored at storage location $DQ_3$. Lastly, the third multiply completes its third cycle with the product of $B_3$ and $DQ_2$ being converted from the floating point format to the fixed point format in the second converting means 40 to provide a third product which is stored in the latch 100.

During the fourteenth operating cycle, $DQ_1$ is transferred from the read buffer 22 to the accumulator 30 over the first bus 16 and through the unidirectional shift register 26 and the summer 28. Also, $DQ_3$ is also read off of the first bus 16 and stored in the write buffer 24. To complete the fourteenth operating cycle, the last operand $B_4$ of the second set of operands is read from the memory 20 and stored in the read buffer 22.

In the fifteenth operating cycle, the fourth multiply begins. The accumulator 30 drives bus 16 with the value of $DQ_3$ and the read buffer 22 drives the bus 18 with the value of $B_4$. Then, $B_4$ is converted from the fixed point format to the floating point format by the first converting means 36 to complete the first cycle of the fourth multiply.

In the sixteenth operating cycle, the third product resulting from the multiplication of $B_1$ and $DQ_2$ is accumulated with the second accumulated product stored in the test register 34. This is accomplished as described before with the latch 100 driving bus 18 with the value of the third product and the test register 34 driving the bus 16 with its contents which is now the accumulation of the first and second multiplication products. The summer 28 sums the second accumulated product with the third multiplication product to provide a third accumulated product which is stored in the accumulator 30. Also during the sixteenth operating cycle, the fourth multiply completes its second cycle with the multiplication of $B_4$ and $DQ_3$ in the multiplier 38.

In the seventeenth operating cycle, $DQ_3$ is transferred from the write buffer 24 to the memory 20 where it is stored therein at storage location $DQ_4$. Also, during the seventeenth cycle, the fourth multiply completes with the fourth multiplication product resulting from the multiplication of $B_4$ and $DQ_3$ being converted from the floating point format to the fixed point format by the second converting means 40. The fourth product is then stored in the latch 100.

In the last and eighteenth operating cycle, the fourth product stored in the latch 100 is accumulated with the third accumulated product which currently resides in the accumulator 30. The accumulator 30 drives bus 16 with the third accumulated product and the latch 100 drives the bus 18 with the fourth multiplication product. The summer 28 adds the third accumulated product to the fourth multiplication product to provide a final accumulated product which is stored in the accumulator 10 and is ready for further processing.

As can be seen from the foregoing, the operation of the system 10 described above completes four multiplies and accumulates in eighteen operating cycles. After the completion of the sixth operating cycle, the operation of the system 10 repeats every four cycles with cycles 7 through 10 being identical to cycles 11 through 15. If the foregoing procedure were utilized to perform eight multiplies and accumulates, it would require 34 operating cycles to complete.

If the first set of operands, namely, $DQ_0$ and $B_1$ are available from other operations, $DQ_0$ could first be stored in the accumulator 30 and $B_1$ could first be stored in the temporary buffer 32. This would negate the need to read these opera ds out of the memory 20 to economize on the number of operating cycles required. For example, if $DQ_0$ is stored in accumulator 30 and $B_1$ is stored in the temporary buffer 32 before the multiplies and accumulates begin, eight multiplies and accumulates can be achieved in just 31 operating cycles. This number of operating cycles is but a fraction of the number of operating cycles previously required in the prior art to accomplish the eight multiplications and accumulates required by the previously mentioned Recommendation G.721. This results in considerable conservation of a portable depletable power source such as a battery.

In addition, it will be noted that during a number of operating cycles, either the arithmetic logic unit 12 or multiplying means 14 or both are not required to perform an operation. During those operating cycles when either the arithmetic logic unit 12 or multiplying means 14 is not needed, they could be de-energized to further conserve on power.

While a particular embodiment of the present invention has been shown and described, modifications may be made, and it is therefore intended to cover in the appended claims all such changes and modifications which fall within the true spirit and scope of the invention.

What is claimed is:

1. A digital multiplication system for efficiently performing a multiplication of first and second operands in a reduced number of successive operating cycles, said system comprising:

memory means for storing said first and second operands;

first and second buses;

read buffer means coupled to said memory means for reading said first operand from said memory means during a first operating cycle and reading said second operand from said memory means during a second operating cycle, said read buffer means also being coupled to said first and second buses;

storing means coupled to said first bus for receiving said first operand from said read buffer means during said second operating cycle as said read buffer means reads said second operand from said memory means; and multiplier means for multiplying said first and second operands, said multiplier means being coupled to said first and second buses for receiving said first operand from said storing means over said first bus and said second operand from said read buffer means over said second bus during a third operating cycle.

2. A digital multiplication system for efficiently performing a multiplication of first and second operands in a reduced number of successive operating cycles, said system comprising:

memory means for storing said first and second operands;

first and second buses;

read buffer means coupled to said memory means for reading said first operand from said memory means during a first operating cycle and reading said second operand from said memory means during a second operating cycle, said read buffer means also being coupled to said first and second buses;

storing means coupled to said first bus for receiving said first operand from said read buffer means during said second operating cycle as said read buffer means reads said second operand from said memory means; and multiplier means for multiplying said first and second operands, said multiplier means being coupled to said first and second buses for receiving said first operand from said storing means over said first bus and said second operand from said read buffer means over said second bus during a third operating cycle, said first operand being a floating point binary number, said second operand being a fixed point binary number, and said multiplier means including first conversion means for converting said second operand fixed point binary number to a second operand floating point binary number during said third operating cycle.

3. A system as defined in claim 2 wherein said first and second operands are operands of first and second sets respectively of operands stored in said memory means, wherein said multiplier means include a multiplier for multiplying said first and second floating point operands during a fourth operating cycle for providing a first binary floating point product and wherein said read buffer means reads a third operand stored in said memory means from said first set of operands, during said fourth operating cycle.

4. A system as defined in claim 3 wherein said multiplier further includes second conversion means for converting said first binary floating point product to a first fixed point product during a fifth operating cycle.

5. A system as defined in claim 4 wherein said storing means receives said third operand from said read buffer means over said first bus during a sixth operating cycle and wherein said read buffer means reads a fourth operand stored in said memory means, from said second set of operands, during said sixth operating cycle.

6. A system as defined in claim 5 wherein said multiplier means receives said third operand from said storing means over said first bus and said fourth operand from said read buffer means over said second bus during a seventh operating cycle.

7. A system as defined in claim 6 wherein said first conversion means converts said fourth operand from a fourth operand fixed point binary number to a fourth operand floating point binary numbers during said seventh operating cycle.

8. A system as defined in claim 7 wherein said storing means is coupled to said second bus for receiving said first fixed point product from said multiplier means during an eighth operating cycle and wherein said multiplier multiplies said third and fourth operand floating point binary numbers during said eighth operating cycle to provide a second binary floating point product.

9. A system as defined in claim 8 further comprising register means coupled to said first bus for receiving said first fixed point product from said storing means over said first bus during a ninth operating cycle and wherein said second conversion means converts said second binary floating point product to a second fixed point product during said ninth operating cycle.

10. A system as defined in claim 9 wherein said storing means receives said second fixed point product from said multiplier means during a tenth operating cycle.

11. A system as defined in claim 10 wherein said register means receives said second fixed point product from said storing means over said first bus during an eleventh operating cycle.

12. A system as defined in claim 11 further including summing means coupled to said first and second bus for receiving said first fixed point product from said register means over said first bus and said second fixed point product over said second bus from said multiplier means, for adding said first and second fixed point products to provide a sum of products, and transferring said sum of products to said storing means during a twelfth operating cycle.

13. A system as defined in claim 12 further including write buffer means coupled to said memory means and to said first bus for receiving said first and third operands during said second and sixth operating cycles respectively over said first bus and conveying said first and third operands to said memory means during said fifth and ninth operating cycles respectively.

14. A system as defined in claim 8 wherein said storing means comprises an accumulator.

15. A system as defined in claim 12 wherein said storing means comprises an accumulator.

16. A multiplication system for performing a series of multiplications of plural pairs of first and second operands, said system comprising:

a memory for storing said plural pairs of first and second operands;
read means coupled to said memory for sequentially reading said first and second operands;
first and second buses;
storing means coupled to said first bus for receiving said first operands from said read means and storing said first operands; and
multiplier means for multiplying said pairs of first and second operands for providing a series of products, said multiplier means being coupled to said first and second buses for receiving said first and second operands in parallel over said first and second buses respectively from said storing means and said read means respectively.

17. A system as defined in claim 16 further including summing means including a summer coupled to said first and second buses for adding said products together to provide a series of accumulated products.

18. A system as defined in claim 17 wherein said summing means further includes register means coupled to said first bus for storing each said accumulated products.

19. A multiplication system for performing a series of multiplications of plural pairs of first and second operands, said system comprising:

a memory for storing said plural pairs of first and second operands;
read means coupled to said memory for sequentially reading said first and second operands;
first and second buses;
storing means coupled to said first bus for receiving said first operands from said read means and storing said first operands;
multiplier means for multiplying said pairs of first and second operands for providing a series of products, said multiplier means being coupled to said first and second buses for receiving said first and second operands in parallel over said first and second buses respectively from said storing means and said read means respectively;
summing means including a summer coupled to said first and second buses for adding said products together to provide a series of accumulated products;
said summing means further including register means coupled to said first bus for storing each said accumulated products;
said first multiplying means including a multiplier for multiplying first and second operands, said first operands being floating point operands, said second operands being fixed point operands, and said multiplying means further including first converting means coupled to said second bus for receiving said fixed point second operands and converting said fixed point second operands to second floating point operands.

20. A system as defined in claim 19 wherein said multiplier provides floating point products, wherein said summing means is configured for adding fixed point products, and wherein said multiplying means further includes second converting means for converting said floating point products to said fixed point products.

21. A multiplication system for performing a series of multiplications of plural pairs of first and second operands, said system comprising:

a memory for storing plural pairs of first and second operands;

read means coupled to said memory for sequentially reading said first and second operands;

first and second buses;

storing means including an accumulator coupled to said first bus for receiving said first operands from said read means and storing said first operands;

multiplier means for multiplying said pairs of first and second operands for providing a series of products, said multiplier means being coupled to said first and second buses for receiving said first and second operands in parallel over said first and second buses respectively from said storing means and said read means respectively;

summing means including a summer coupled to said first and second buses for adding said products together to provide a series of accumulated products and register means coupled to said first bus for storing each accumulated product of said series of accumulated products, said accumulator being coupled between said summer and said first bus, said accumulator temporarily storing said accumulated product and conveying said accumulated product to said register means over said first bus.

* * * * *